(12) United States Patent
Stephens et al.

(10) Patent No.: US 10,099,105 B2
(45) Date of Patent: *Oct. 16, 2018

(54) GOLF COURSE PACE OF PLAY MANAGEMENT SYSTEM AND METHOD

(71) Applicants: William Kift Stephens, Charleston, SC (US); Timothy Michael Wood, Clifton, VA (US)

(72) Inventors: William Kift Stephens, Charleston, SC (US); Timothy Michael Wood, Clifton, VA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/831,438

(22) Filed: Dec. 5, 2017

(65) Prior Publication Data

US 2018/0093158 A1    Apr. 5, 2018

Related U.S. Application Data

(63) Continuation of application No. 15/375,869, filed on Dec. 12, 2016, now Pat. No. 9,868,045.

(60) Provisional application No. 62/290,498, filed on Feb. 3, 2016.

(51) Int. Cl.
*A63B 71/06* (2006.01)
*H04W 4/00* (2018.01)
*H04W 4/02* (2018.01)
*H04W 4/50* (2018.01)

(52) U.S. Cl.
CPC ...... *A63B 71/0616* (2013.01); *A63B 71/0619* (2013.01); *H04W 4/001* (2013.01); *H04W 4/025* (2013.01); *H04W 4/50* (2018.02)

(58) Field of Classification Search
None
See application file for complete search history.

(56) References Cited

U.S. PATENT DOCUMENTS

| | | |
|---|---|---|
| 5,305,201 A | 4/1994 | Matthews |
| 5,324,028 A | 6/1994 | Luna |
| 5,523,985 A | 6/1996 | Nixon |
| 5,524,081 A | 6/1996 | Paul |
| 5,664,880 A | 9/1997 | Johnson |
| 5,772,534 A | 6/1998 | Dudley |
| 6,062,985 A | 5/2000 | Rege |
| 6,135,893 A | 10/2000 | Probert |
| 6,236,360 B1 | 5/2001 | Rudow et al. |

(Continued)

*Primary Examiner* — Tramar Harper
(74) *Attorney, Agent, or Firm* — B. Craig Killough; Barnwell Whaley Patterson & Helms

(57) ABSTRACT

A device and method for regulating a pace of golf play. A golf course is divided into segments, with each segment assigned a time for completion by a user golfer group. Spaced apart signal lights are positioned on the golf course. Each golfer group is provided with a wireless positioning device. A computing device compares an elapsed time for completion of a number of segments with the total assigned time for the number of segments completed. The computing device wirelessly actuates a visual signal to the golfer group by a signal light on the golf course when the elapsed time for completion of the number of segments by the user golfer group is greater than the total assigned time for the number of segments completed. The device and method take into account impediments to pace of play that are outside of the golfer group's control.

20 Claims, 8 Drawing Sheets

(56) References Cited

U.S. PATENT DOCUMENTS

| | | | |
|---|---|---|---|
| 6,346,055 B1 * | 2/2002 | Rege | G07C 1/22 368/10 |
| 6,348,007 B2 | 2/2002 | Kawasaki et al. | |
| 8,113,964 B2 | 2/2012 | Lindsay | |
| 2001/0006489 A1 | 7/2001 | Gaffney | |
| 2002/0016674 A1 | 2/2002 | Rudow et al. | |
| 2004/0064206 A1 | 4/2004 | Kim | |
| 2004/0073325 A1 | 4/2004 | Reeves | |
| 2004/0203410 A1 | 10/2004 | Kim | |
| 2004/0243262 A1 | 12/2004 | Hofmann | |
| 2006/0044544 A1 | 3/2006 | O'Loughlin et al. | |
| 2009/0201263 A1 | 8/2009 | Hofmann | |
| 2010/0160057 A1 | 6/2010 | Willett | |
| 2010/0179005 A1 | 7/2010 | Meadows et al. | |
| 2014/0119098 A1 | 8/2014 | Irish et al. | |
| 2014/0379105 A1 | 12/2014 | Glasson et al. | |

* cited by examiner

Golfer Group Info — 601

```
ooo AT&T        5:05 PM           82%
Menu         Blue Course       Refresh
```

Olazabal                    7:35am Tee
+13 mins              +10 mins Blocked
  vs. Time Par         +3 mins At Fault Recent: −1 vs. Time Par   [Turn on Light]

| | | | |
|---|---|---|---|
| 1 |  | −1 | +1 |
| 2 | 0 | +1 | 0 |
| 3 | +1 | +2 | −1 |
| 4 | −1 | −1 | |
| 5 | +3 | +1 | +3 | 0 |
| 6 | +1 | 0 | 0 |
| 7 | +4 +1 | 0 | |
| 8 | −1 | 0 | 0 |
| 9 | | | |

[Blocked]

Traffic Map Screen — 603

```
ooo AT&T        5:05 PM           82%
Menu         Blue Course       Refresh
```

| | On Pace | > 3mins | Blocked |
|---|---|---|---|
| 1 | Ste |  | Woo |
| 2 |  | Mar |  |
| 3 |  | Spi | Woo |
| 4 |  | Pal |  |
| 5 | McI |  | Mic |
| 6 |  | Ros |  |
| 7 |  | Wat |  |
| 8 |  |  |  |
| 9 | Ola |  | Joh |
| turn | Mol |  |  |
| 10 | Sne |  |  |
| 11 | Sco |  | Mic | Haa |
| 12 | Wes Sin |  | Day |
| 13 |  |  |  |

Golfer Groups List

```
ooo AT&T        5:05 PM           82%
Menu         Blue Course       Refresh
```

| | Group | Recent | Status |
|---|---|---|---|
| 1 | Stephens | -- | -- |
| 1 | Wood | −1 min | -- |
| 2 | Markle | -- | -- |
| 3 | Spieth | -- | blocked |
| 3 | Woods | +3 min | ▨ |
| 4 | Palmer | −1 min | -- |
| 5 | McIlroy | +3 mins | ▨ |
| 5 | Nicklaus | +1 min | -- |
| 6 | Rose | -- | -- |
| 7 | Watson | +4 min | ▨ |
| 8 | -- | -- | -- |
| 9 | Olazabal | −3 mins | -- |
| 9 | Johnson | −2 mins | -- |
| turn | Holmes | +2 mins | -- |
| 10 | Snedeker | +3 mins | ▨ |
| 11 | Scott | -- | -- |
| 11 | Mickelson | -- | -- |
| 11 | Haas | −1 min | -- |
| 12 | Westwood | -- | blocked |
| 12 | Singh | +4 mins | ▨ |
| 12 | Day | −1 min | -- |

Course Hot Spots
Average Play Time vs. Time Par
(This should be heat mapped.)

```
ooo AT&T          5:05 PM         82%
Menu          Blue Course      Refresh
o Avg Play Time vs. Time Par
o Average  Blocked  Time
1   | -- | +.1 | +.8 |      +.9 mins
2   | +.1| -.1 | 0   |       0 mins
3   | -.8| +.1 | -.3 |      -1.0 mins
4   | 0.0| +1.8|             +1.8 mins
5   | 0  | +.6 | -.5 | -.3 | -.4 mins
6   | -.1| +1.2| +.1 |      +1.2 mins
7   | +.2| +.3 |             +.5 mins
8   | 0  | -.1 | -.5 |      -.6 mins
9   | +.5| +.3 | +.1 | +.8 | +1.7 mins
turn| -.2|                   -.2 mins
10  | +.5| 0   |             +.5 mins
11  | -.1| 0   | +.1 | 0   | 0 mins
12  | 1.2| 0   |
13
14
15
16
17
18
```

── 602

Course Hot Spots    605
Average Blocked Time
(This should be heat mapped.)

```
ooo AT&T          5:05 PM         82%
Menu          Blue Course      Refresh
o Avg Play Time vs. Time Par
o Average  Blocked  Time
1   | -- | 0.1 | --  |
2   | .2 | .4  | --  |
3   | .3 | .4  | --  |
4   | 1  | --  |
5   | 0  | .2  | .3  | --  |
6   | .7 | .3  | --  |
7   | 1.5| --  |
8   | .1 | .1  | --  |
9   | .3 | .6  | .2  | --  |
turn| -- |
10  | 2  | --  |
11  | .4 | .1  | .2  | --  |
12  | 0  | --  |
13  |    | --  |
14  |    | --  |
15  |    |     |     | --  |
16  |    | --  |
17  |    |     |     | --  |
18  |    | --  |
```

FIG.6B

GOLF COURSE PACE OF PLAY MANAGEMENT SYSTEM AND METHOD

This application is a Continuation of application Ser. No. 15/375,869, filed Dec. 12, 2016 and claims the benefit of priority from U.S. Provisional Application No. 62/290,498, filed Feb. 3, 2016.

FIELD OF THE INVENTION

The present invention relates to regulating a pace at which groups of golfers progress around a golf course.

BACKGROUND OF THE INVENTION

Golf's popularity is adversely impacted by the amount of time it takes to play a round. Concerns about "pace of play" and the time it takes to play 18 holes are cited overwhelmingly as a primary contributor to this decline. A fall off which can be measured in many billions of dollars of negative impact on the industry.

There is a need for a system that helps golf course management better control player flow and speed of play. There is a need for a system to help maximize course revenue by better managing the number of rounds that can be played in a day at an acceptable pace.

SUMMARY OF THE INVENTION

The present invention is a system for regulating the pace of golf play. A golf course is divided into segments, with each segment assigned a time for completion by a user golfer group. Spaced apart signal lights are positioned on the golf course preferably at the top of each flagstick. Each golfer group is provided with a wireless positioning device. A computing device receives signals from the wireless positioning device indicating progressive segments in which the golfer group is located. The computing device compares an elapsed time for completion of a number of segments with the total assigned time for the number of segments completed. The computing device wirelessly actuates a visual signal to the golfer group from a signal light of the spaced apart signal lights on the golf course when the elapsed time for completion of the number of segments by the user golfer group is greater than the total assigned time for the number of segments completed. The actuated signal light is a warning to the proximate golfer group that they are playing too slowly. The segments that are monitored for timed progress are determined by events that occur during play, such as being blocked by another user golfer group, which would not be an "At-Fault" situation by the user golfer group.

BRIEF DRAWING DESCRIPTION

FIG. 1 demonstrates components of an embodiment of the invention.

Figure 2A:
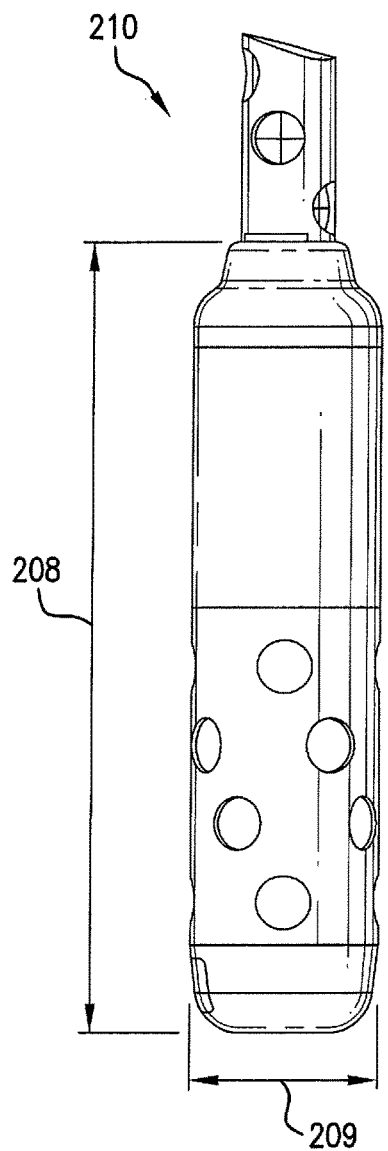
FIG. 2A is an elevation of a signal light.
Figure 2B:
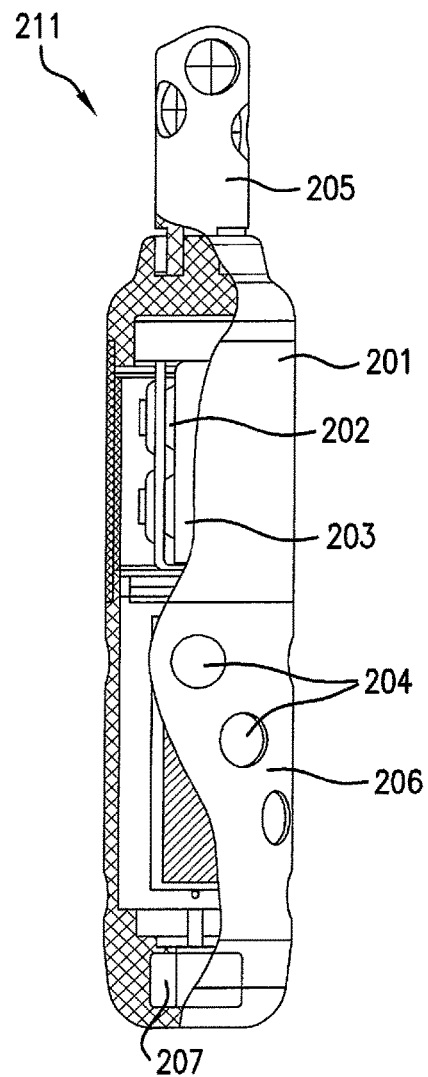
FIG. 2B is a partially cut away signal light of FIG. 2A.
Figure 2C:
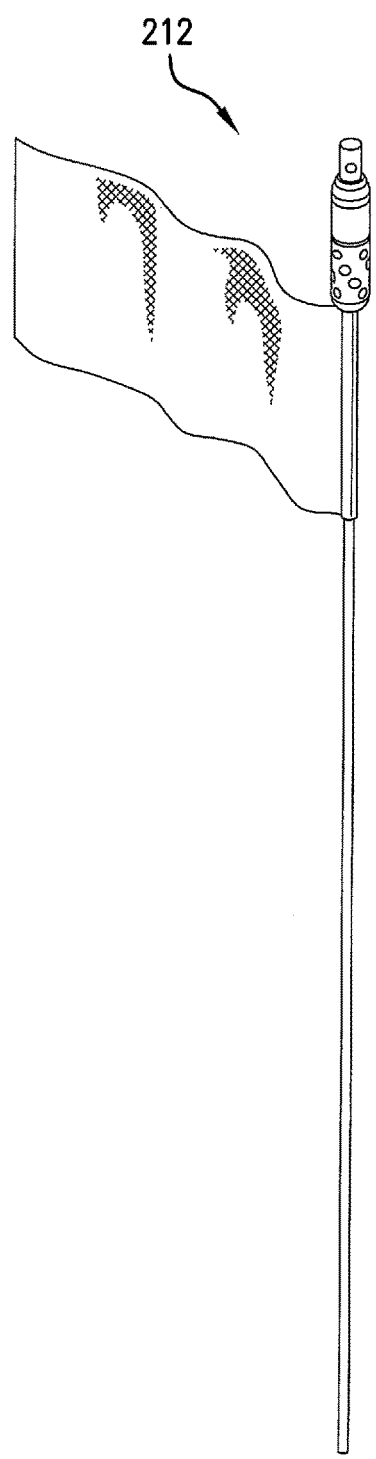

FIG. 2C demonstrates the signal light mounted to a flagstick as used on a golf green.

Figure 3:
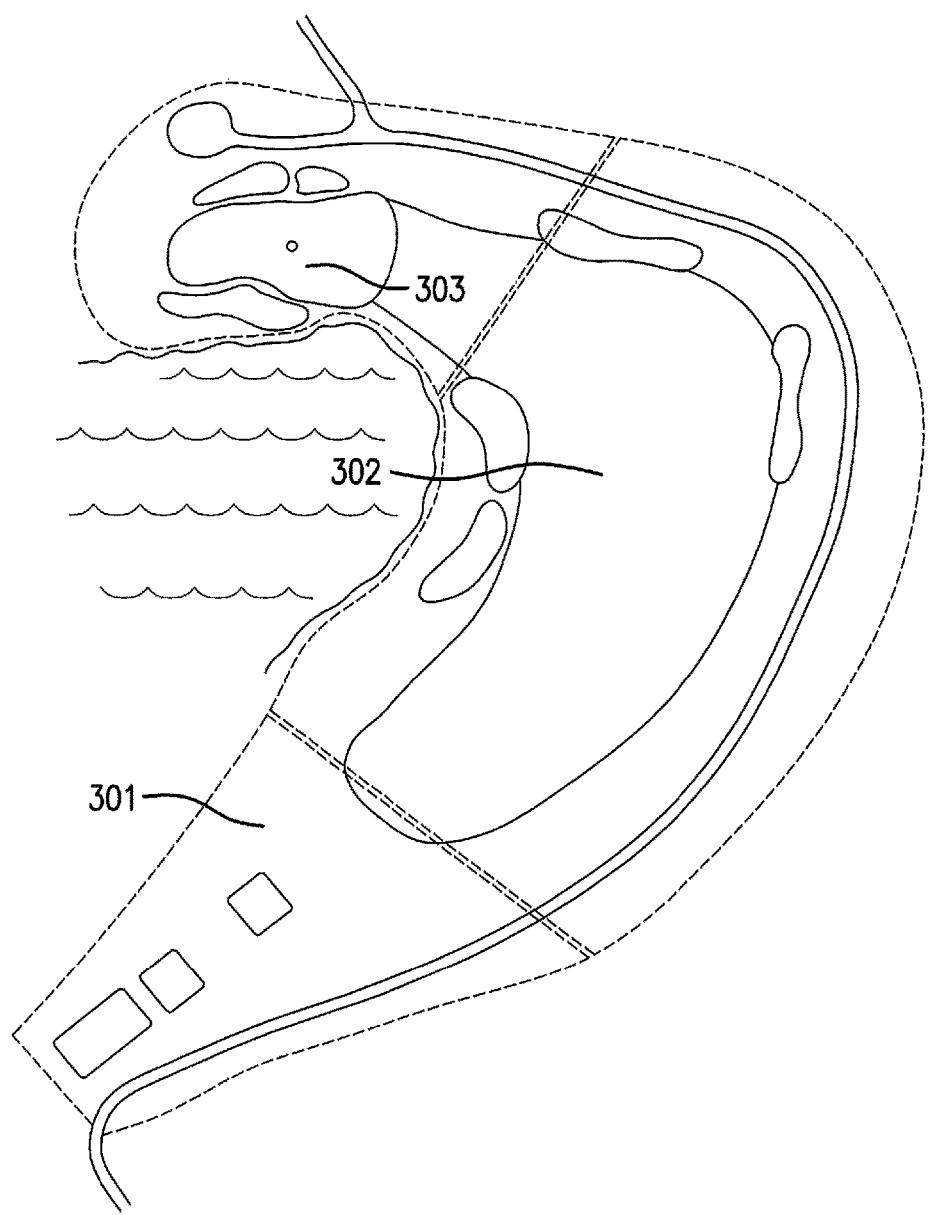

FIG. 3 is a diagrammatic overview of a typical par 4 hole showing segmentation or geo-fencing of the hole.

Figure 4:
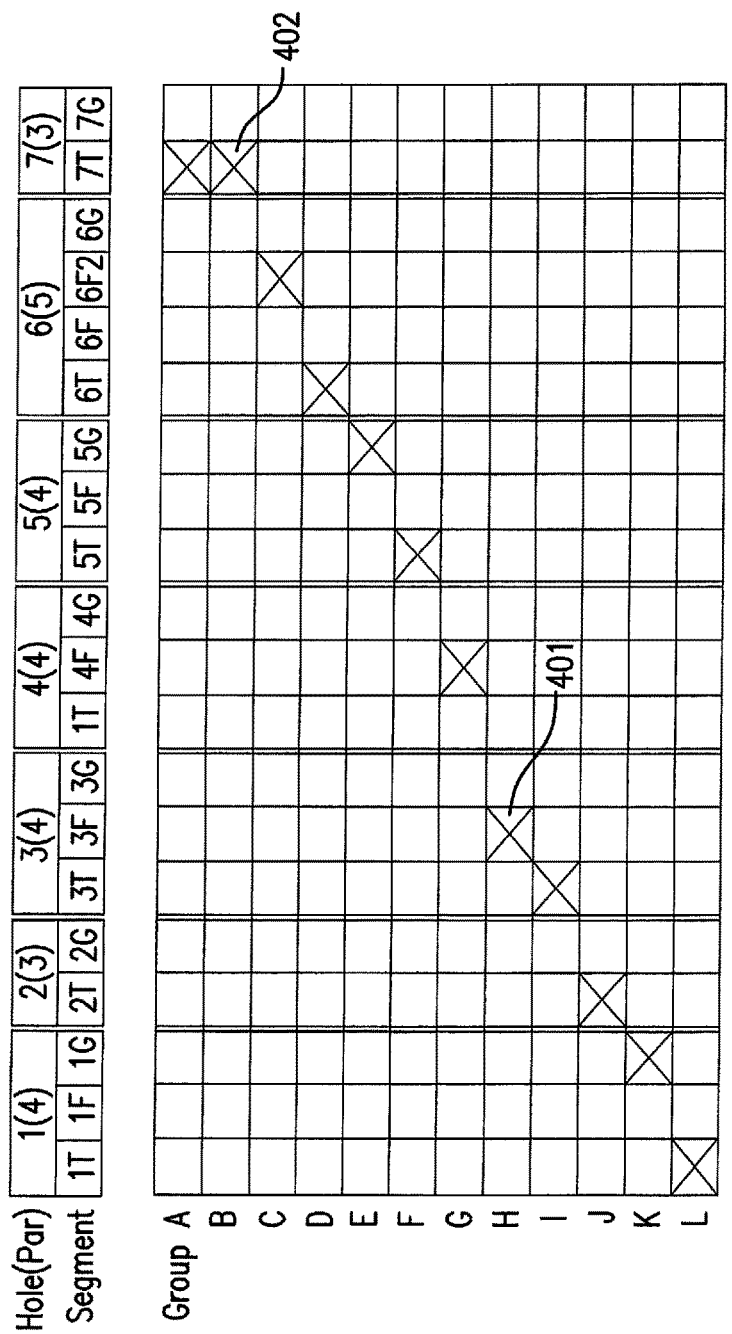

FIG. 4 demonstrates location tracking by segment of golfer groups at a point in time, indicated by the "X's."

Figure 5:
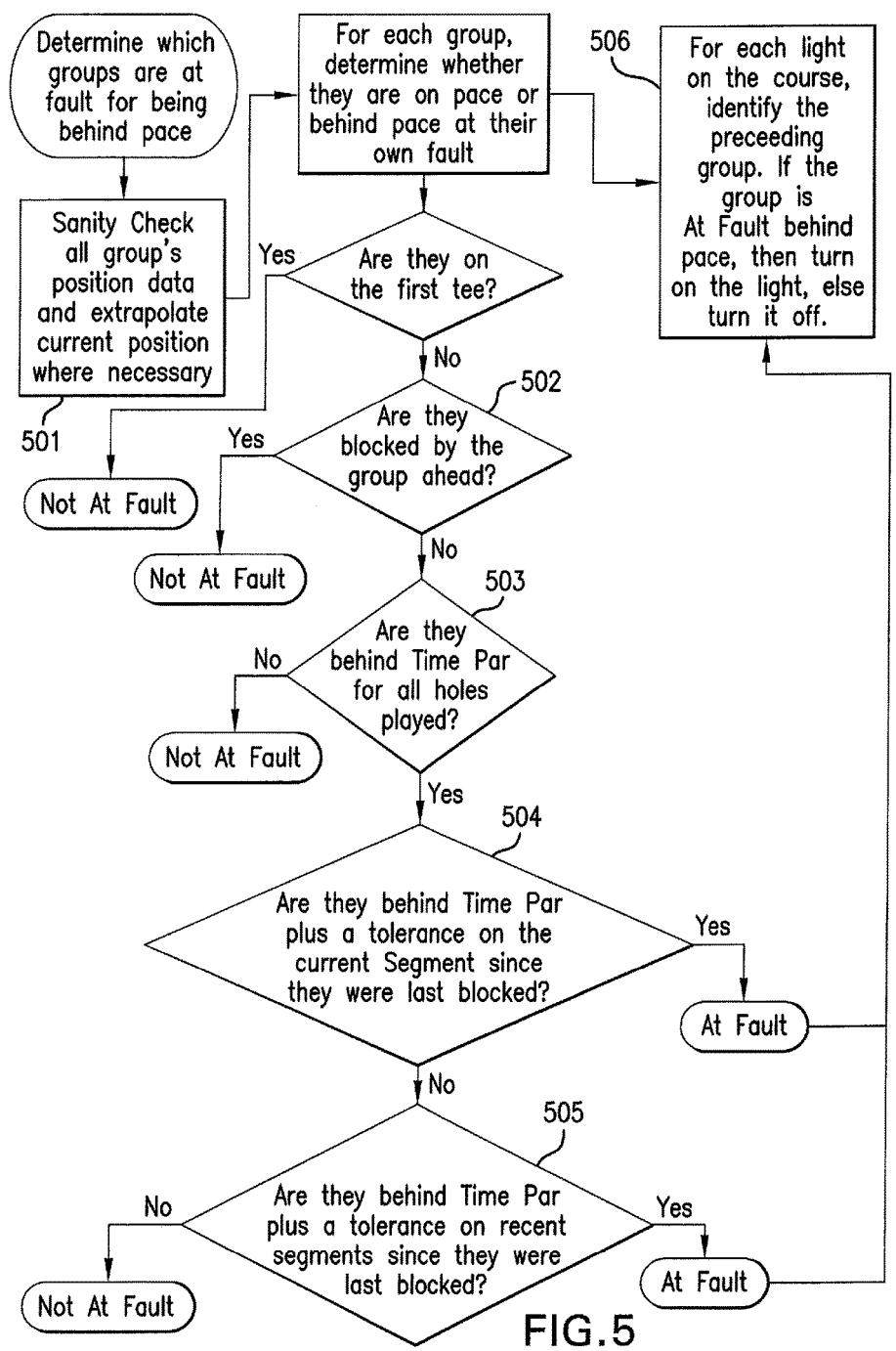

FIG. 5 is a logic flow diagram of an embodiment of traffic control algorithms to determine when a group is at fault for slow play.

FIG. 6A is a series of application screens that assist course management in monitoring and managing pace of play.

FIG. 6B shows additional application screens that assist course management in monitoring and managing pace of play.

DESCRIPTION OF PREFERRED EMBODIMENTS

The present invention assists golf course management to regulate a pace at which groups of golfers, as users of the golf course, progress around the course. The pace is determined by management to be optimum for player enjoyment and course economics. Using integrated technologies, such as GPS and the Internet, the invention tracks golfers and makes intelligent decisions about whether a golfer group is playing at the speed it should be playing. If not, then it quickly, clearly and directly signals them to do so.

In one embodiment, the invention comprises the following integrated components: 1) a computing device, which may be a cloud based server, that uses pace management algorithms and controls messaging according to the invention; 2) a positioning device for each golfer group, which may be a small GPS tracking device or smartphone application, and carried by each golfer group on the course (walking or riding); 3) a plurality of signal lights that are spaced apart on the course, such as a flagstick attachment, which in one embodiment each signal light includes LED light emitters, a diffuser, a rechargeable power source, a GPS chip, and a controller module; 4) connectivity to the Internet and between component devices utilizing such protocols as LAN, cell services or Wi-Fi, and, which in one embodiment, is based on implementing an LPWAN on the golf course for the flagstick and GPS trackers connecting through a gateway to the Internet; 5) a number of mobile and desktop applications to allow for system setup, monitoring and control by golf course management at the clubhouse, starter and marshal positions.

Figure 1:
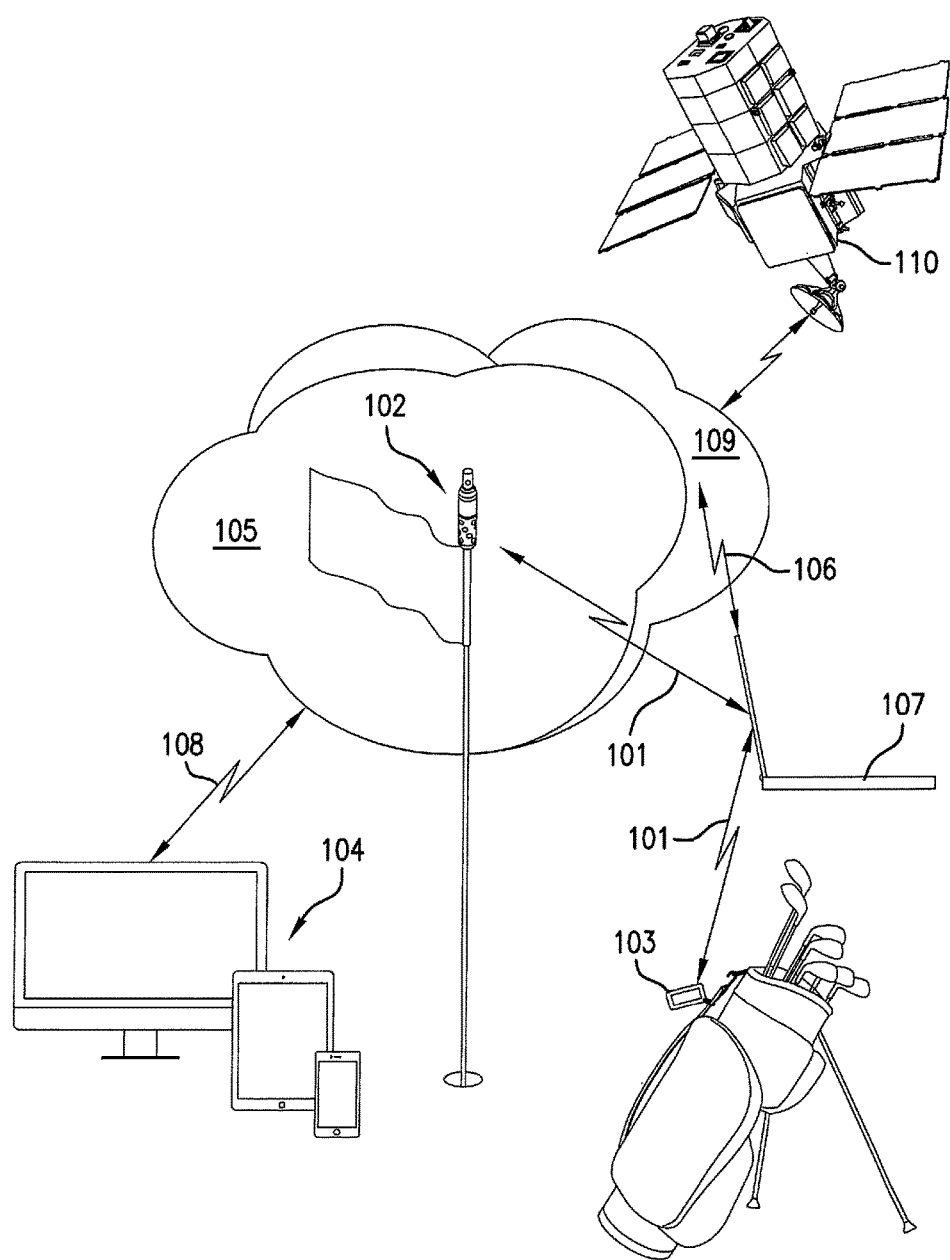

FIG. 1 demonstrates components of an embodiment of the invention. A cloud based server 105 is a computing device hosting the communications and messaging control software 109, along with the course specific time par, GPS mapping and current positioning data, and as well as the algorithms that constitute the pace management code. The cloud server also is the repository for all timing data that may be determined to be of importance for reference to improve the future effectiveness of the system.

For example, data such as average playing times under certain weather conditions, or green speeds, or length of rough, or other factors that impact pace of play may be kept and analyzed for the purpose of adjusting future time pars under similar conditions. The system may store data on individual golfer or group pace of play performance for future reference in one embodiment.

Using GPS technology 110 for positioning data, a GPS tracking device 103 is carried by every golfing group so that their position on the course may be tracked and monitored by the system. The positioning device is compatible with walking (with a golf bag), pushing a cart or riding a golf cart.

A plurality of signal lights, such as flagstick 102 with a remotely controlled integrated light, warn groups when they have fallen behind the pace of play as set and monitored by course management. Applications 104 for desktop, tablet or smartphone are used by course management (starter, marshal, pro shop) to set and change system parameters, track all group movements, note anomalies and problem spots, and monitor at fault alerts in case a marshal's presence and intervention becomes necessary.

Connectivity is established between the components of the invention, such as through the Internet 108. A low power wide area network (LPWAN) 101 on the golf course for the flagstick and GPS trackers may connect through a gateway 107 to the Internet. Alternative embodiments include direct connectivity to the Internet for these components via a cell network 106.

FIG. 3 exemplifies how an 18 hole course using the invention may be divided into segments. The segments may represent ball-landing/striking areas. For example, on a par 4 hole, there may be three segments, such as: tee complex 301; drive landing and fairway approach shot hitting area 302; and green complex 303. Each segment is outlined by the dotted lines representing geo-fenced boundaries for that segment. A time par is assigned to each segment. The sum of the time pars for each segment equals the time par for the hole.

The tee complex 301 comprises the immediate area surrounding and including all tee boxes and any adjacent cart path and cart parking area. Specific course design may indicate other areas or features that are associated with the tee boxes that are part of the tee complex.

The green complex 303 comprises the green and an area surrounding the green, including traps associated with the green and cart path and/or parking area for the green. The area surrounding the green that is part of the green complex may be an area of about 40-75 yards on the fairway side of the green, and 20-35 yards around the perimeter of the green.

A typical 18 hole course may have 50 to 60 segments, depending on the course par rating, length, hazards, and other factors. In a preferred embodiment, the minimum number of segments for the golf course is the course's par stroke rating minus the number of holes that comprise the course. For example, a par 72 18 hole course may have not fewer than 54 segments.

Segments are geo-fenced in the system with an assigned playing time representing a portion of the total "time par" for the hole, and likewise, the hole being a portion of the total time par for the course or for a group of contiguous segments. As groups progress around the course, if they are playing at a prescribed pace as assigned by course management, each group should be located in a particular segment at a particular time as calculated by the invention.

"Time pars" for each segment are determined by course management, preferably based upon standard industry pace-rating formulas. These times may be further informed and modified by unique course characteristics or peculiarities. Course management has the ability to tune any of these times in the invention based on numerous considerations like player field skill levels, weather, course conditions, tee time intervals, special events and other factors that impact pace of play.

Each golfer group playing the course carries one or more small positioning devices, such as a GPS tracking device. The invention monitors each group's location, progress, and relative position to other groups on the course. The system according to the invention determines which segment each group is in, and how long they have been in it. By comparing positioning data with target time par data, the system determines with relative immediacy any group that is off pace. Factors taken into account in determining whether a group is at fault for playing too slowly may include: 1) Is the group blocked by the group in front of them? 2) Based on their actual start time, where should the group be? 3) How long has the group been in the current segment? 4) How long has the group taken to arrive at their current location since they were last blocked? 5) How long has the group taken to arrive at their current location since they began playing the segments comprising the most recent holes played?

In addition to these various pace of play factors, certain time tolerances (tolerance time) may be added or subtracted under predefined circumstances so that a group is not presented with a warning light for a minor delay; or conversely be allowed too much time after being blocked, given that they have had time to set-up for their next shot. Tolerance time may be added to the current segment in which the golfing group is present, and in some situations, for additional previously completed segments (recent segments). Recent segments may comprise up to and including completed segments that are part of previous holes, for example, the previous 2 holes.

FIG. 4 shows an example segmentation table with the current location of golfer groups indicated by the "X's." The table may be presented to course management on an electronic display using information provided by the computing device. No more than one group should be positioned in a single segment (402) at any one time, and no group should have another group positioned in the preceding segment (401) unless that group in front is on a tee box. Either of these occurrences is an indication of a blocked group.

When the computing device, applying the algorithm, determines that a group is at fault for not keeping pace, the offending group is given a clear visual signal by lighting up the appropriate proximate signal light or flagstick. "Appropriate" in the case of a flagstick light signal may mean either they are currently chipping or putting around that flagstick, or are hitting into it from the fairway (or tee box if a par 3). The light can be thought of as being analogous to a two minute warning in football or a soon to expire basketball shot clock, indicating that urgency is required An alternative embodiment may have the signal light blink on-and-off versus full-on as indication of a first time or less serious At-Fault slow play scenario.

The invention directly addresses the group at fault for playing too slow or otherwise not keeping pace, while not signaling a group that is behind the assigned pace because they have been held up or otherwise delayed for reasons beyond their control. While course management, such as a course marshal, is also actively alerted upon the occurrence of an At-Fault group determination, immediate and direct communication with the At-Fault players is key to improving overall course pace and round times. In most cases, little to no lag time occurs between the initial determination of slow play and effective communication to the players' At-Fault.

After the At-Fault group is alerted, it is expected that the informed golfer group will make every effort to get back on time par pace. The system adjusts for lost or blocked time so the At-Fault group is not signaled again on the next hole if they successfully achieve the required pace (but do not necessarily make up for all lost time). Group(s) that are blocked are not "penalized" for the time they were blocked. In an alternative embodiment of the method, groups that are found to be slow due to their own pace of play are pushed by the system signals to make up for lost time and close the gap with the group ahead. In other words, time par for the group over successive several holes may be compressed to encourage a faster "catch-up" pace.

The system logs and provides a repository for pacing data. Collected data allows analysis of par times versus actual times under different conditions; individual group and player times; the impact of tee intervals on throughput and average round times; etc. Timing data showing the history of "clear times" (time since blocked to complete the last two segments of every hole) for every hole may be analyzed for use such as informing maintenance operations regarding course set up issues, or adjusting tee intervals to alleviate bottlenecks. The computing device, for example, collects and stores data that may be helpful in improving future pace of play.

Course management applications (examples shown in FIGS. 6A and 6B) may include easy to read course traffic maps and charts showing graphic displays of group progress around the course, time differentials from time par adjusted for any blocking, and the color-coded highlighting of any At-Fault (and repeat At-Fault) groups.

As shown by some of the example applications in FIGS. 6A and 6B, course management personnel are able to map the course segments, set and adjust all par time parameters, assign groups to starting times, assign location device (GPS tracker or tracking unit) IDs, view the location and progress of all groups on the course, receive alerts, override the system to manually control flagstick lights as necessary and access and analyze all tracking and timing data as may be helpful to improving the effectiveness of the system. Example screens providing information are: 1) The Golfer Group Info page 601 shows the status of each group of golfers vs. time par and their history by segment for the round; 2) The Course Hot Spots (Average Play vs. Time Par) page 602 shows to course management which holes and segments have been playing slow for all the rounds that day; 3) The Traffic Map page 603 provides a visual overview of where each group is positioned on the course and each group's pace status, i.e. on pace, blocked, slow, or flagstick light on; this information may be augmented by a course layout map graphically illustrating the location of each group; 4) The Golfer Groups List page 604 provides a list of all the groups on the course by hole and their current pace of play status; 5) The Course Hot Spots (Average Blocked Time) page 605 shows course management which holes or segments have been behind the assigned or "par" time most frequently for the day or other time period, thus providing an indication of where golfers have been most frustrated.

In an embodiment, the invention comprises five interconnected and integrated elements that work in concert to help manage the pace of play and the consistency, separation and flow of groups on the golf course. FIG. 1.

A computing device, which may be a cloud-based server acts as the "brains" of the system and hosts "traffic control" code for pace of play utilizing a series of proprietary algorithms, progressive logic FIG. 5 and course specific mapping/segmentation and timing data. The computing device collects all actual hole-by-hole, course and player/group timing data for analysis and use to improve future round times.

A wireless positioning device, such as a small GPS tracking device or smartphone application, is carried by every golfer group on the course. The device may be permanently installed on a cart, or temporarily attachable to a golf bag, or carried by a golfer.

In a preferred embodiment, at least one light signal is visible from each segment that either includes the green complex or the approach to the green complex. Accordingly, in this embodiment, each flagstick 102 incorporates a light emitting flagstick attachment 210, 211. Each light emitting flagstick attachment or signal light may include one or more diffused high intensity LED lights, a rechargeable power source, a GPS chip, and a micro-controller and communications module (FIG. 2B). The GPS chip is used to determine at which hole the flagstick is positioned. An alternative embodiment is a stationary light signal in place of the flagstick light 210 in functionality, but permanently installed behind the green and back from the field of play; also easily visible upon approaching the green. Another alternative is to mount a light emitting signal on each golf cart, particularly at golf courses where the use of golf carts is mandatory.

FIG. 2B is a flagstick embodiment 211 showing exemplary integrated components that allow two-way communications, and control of the light and associated power management. FIG. 2A demonstrates that the light 210 and component parts may be contained in a small housing (208/209). The housing may be cylindrical to approximate the flagstick construct, and attachable to the top portion of the flagstick. On the outside, the device may include reflective surfaces for laser rangefinder compatibility 204, with the top of the light having a threaded member such as a bolt to attach a standard third party laser reflector 205. FIG. 2B. The light compartment housing 201 may be formed of a coated or diffusion frosted polycarbonate. Light emitter 202, which may include several LED lights, is visible from a minimum of 180 meters down the fairway in a preferred embodiment. A LED light plate 203 may be provided. The lower body of the light housing 206 may contain a signal and communications control unit, an LPWAN transmitter/receiver, a GPS transponder, a power source, which may be one or more rechargeable lithium batteries, and an inductive charging mechanism with a power charging regulator. The component housing is preferred to be formed from shock resistant material such as elastomers, which may be rubber/foam sheathing to protect internal components from harm when the pin is dropped or roughly treated. A solar recharging device may be used in environments where adequate sunlight is available. A communications antenna is provided and housed in the body of the cylindrical form. Mounting may be provided by a steel base plate with integrated quick release/install mount onto the flagstick bolt 207.

A signal light that is not mounted to a flagstick may comprise the same or similar operating components as those shown in FIG. 2B. Such signal lights may be positioned behind the green out of the field of play or otherwise be positioned along the course or on golf carts so as to not interfere with normal play.

As shown and described in FIGS. 6A and 6B, applications are provided for set up, monitoring, control, and two-way communications with the system. These applications preferably operate on a desktop computer as well as a smart phone or tablet or similar device.

The positioning devices and light signals have connectivity with the computing device. Communications may be via the Internet via the cloud-based server. One embodiment uses a low power wide area network (LPWAN) between these devices and a gateway on the golf course that connects to the Internet. Alternative embodiments include direct connectivity to the Internet for the positioning devices and signal lights through alternative networks such as a cell phone network.

The concept of "time par," or the idea that a round of golf should be played within a certain carefully considered and reasonable amount of time, is a basis of the invention. The expected time to complete a round of golf should be clearly disclosed to golfers.

"Time par" is the target elapsed time in which, for a particular course under normal circumstances, a foursome should reasonably be able to play a full round of 18 holes. Time par is often calculated and assigned by the USGA affiliated state golf association using a standard pace rating formula, and may subsequently be modified locally for unique circumstances and course peculiarities.

Time par, or round time, for a course is made up of the sum of the individual time pars for each hole considering distance, travel time, shot preparation and execution times, slope and hole design, hazards, time allotted for walking between holes, stopping at the half-way house, etc. This largely formulaic time par round time can then be adjusted by course management as deemed necessary to account for any consequential changes in conditions (weather, green speeds, cart path restrictions, length of rough, tournament play, etc.). Time par may also be adjusted in the invention to the pace course management may want to set for different times of the day to cater to different types/handicap levels of golfers. For example the invention could be set to manage 3:45 rounds in the morning and then reset to 4:15 rounds starting at noon; or 3:45 rounds on Saturdays and 4:15 rounds on Sunday. By communicating these variables to golfers in advance, golfers have a choice as to the pace they feel they are capable of and want to play. This feature allows the course to adjust pace with consideration for the level of demand.

It may be possible to create entirely new patron demand by offering, for example, "fast play" rounds of 3 hours, setting the invention to facilitate that round time. Golfers who wish to play 18 holes after work have an opportunity to do so. Courses may attract patrons who are not time constrained at normally light play times of the week, potentially generating more patrons at those times. Since round time par is made up of the sum of time par for all segments, by adjusting that total time, each segment may be automatically modified proportionately. In another embodiment, individual segments may be adjusted separately. For example, if the greens are running excessively fast, then management may choose to add a certain amount of extra time to all green complex segments. If the rough is exceptionally high and thick, then they may want to add some time to adjust fairway segments. Or adjust the "clear time," which is made up of the time it takes to play, since last blocked, the last two segments of every hole.

A course's time par information is then entered into the invention's system tables and housed in the computing device, where it serves as key reference data in calculating the pace of play and progress for all groups on the course.

Effectiveness of the invention in regulating the pace of play is dependent on all parties' buying into the goal of playing at an appropriate and reasonable pace so as to finish within a predetermined time. Players should be advised in advance as to the round time target and agree to make reasonable efforts to comply. Players must be willing to respond positively and increase the pace should they receive a signal that they are falling behind. No pace of play system can be expected to be effective in improving round times if the golfers are not willing to participate positively in that process. Likewise, course management must embrace the system and be diligent and effective in implementation and enforcement.

Part of achieving the desired pace of play, and therefore the targeted round time, is the "tee time interval," or the time gap between groups as they tee off. This timing, set by course management, must take into account the layout and sequencing of holes, as bottlenecks causing excessive group wait times are likely to develop on certain holes if the interval time is set too short. Any par 3 with a time par greater than the tee time interval is a prime candidate for being a bottleneck since typically, only one group at a time can play a par 3. If the tee interval is too long, then while bottlenecks and wait times may be few and round times shorter, throughput, and therefore revenue, may suffer as the course is not able to accommodate as many players within a fixed amount of time (daylight). This balancing act between round times and daily course throughput—between impeded and unimpeded play—is precisely what this invention is designed to facilitate.

As part of the invention, each playing group is provided with at least one wireless positioning device, such as a portable GPS transponder or smartphone application that communicates with the computing device. The positioning device may be preinstalled on a golf cart, or easily attachable to a golf bag in the group, or carried on a person.

The tracking device may be identified to the system with the names in the group to which it is provided (example: Jones, Smith, Wood and Stephens; tee time 8:42; GPS device # 17) by the pro shop or starter. The identification may be accomplished with a simple system entry or cross-referenced with the tee sheet. If the tracking device is not identified to the system with a tee time and/or golf group name(s), in an embodiment, the system automatically assigns a unique generic group name/identification and notes a tee time equal to the actual time the group exits the first segment of the first hole played.

In one embodiment, the cloud based system "brains" or "traffic control" follows each group's progress around the course by frequent sampling of their location. The location of the assigned GPS is monitored every 10-15 seconds and compared with time par to determine pace of play, either from the start of play, for the current segment and/or for several of the most recent holes or segments. Most recent pace of play may be calculated, for example, by determining the group's progress over the most recent several holes (e.g. current segment(s) on the current hole+all segments of, for example, the last 1 to 3 full holes) versus the cumulative time par for all those same segments.

The invention may compare a golfer group's position on the course relative to a group behind and/or ahead of them. The primary focus of this surveillance is to identify groups that are playing behind the time par pace and then distinguish whether this is caused by slow play ahead of them (being blocked), or if the causation of the slow play is of their own doing (At-Fault). Therefore, the invention not only determines if there is slow play, but also identifies a cause. The system communicates to the "At-Fault" group, and only that group, via a light signal, that they have fallen behind pace. The signal suggests that the group must make an effort to improve their pace of play relative to the group ahead of them. In other words, the At-Fault group should endeavor to return to the position indicative of a proper pace of play. The invention continues to signal the At-Fault group via the closest light signal in their forward path if they do not quickly improve their pace of play. While the invention does not assume a complete "catch-up" player reaction, an understanding should be sought between the players and course management such that if they are signaled for slow play, they should try in earnest to get into the correct relative position on the course vis-a-vis the groups in front of and behind them.

The methodology for the invention subdivides each of the 18 holes into segments. Each segment may represent a prototypical landing and hitting area on the hole from where the average player will land and play most of their shots as they progress on the hole and around the course. Density patterns of divot marks are useful in creating and mapping these segments, as they are unique for every course. Segments necessarily share common borders and extend on the sides past the rough into the edges of wooded and high grass/shrub areas where a ball might land, usually be found and played without a drop. Where fairways are close and run parallel to each other they likely share a common side boundary.

For example, on a 430 yard par 4 there is a first segment which encompasses the tee box complex; a second segment from just in front of the tee box and down the fairway 335 yards to a third segment that starts 50 yards from the front of the green complex. This third green complex segment includes the green and its surrounding playing area plus any adjacent cart paths and cart parking area. An 18 hole course may have approximately 50 to 60 such segments depending on the course's par stroke rating, overall layout or particular peculiarities. Depending on the architecture of the hole, a drop area may be determined to be a special segment by itself. In addition, a long travel distance between holes, the area around a rest stop, or a half-way house under most circumstances is designated as a separate segment with an appropriate time allotment.

The course is thusly divided into these hole segments which are mapped and geo-fenced into the system and which represent a playing footprint wherein, when play is flowing as it should be with no waiting, there should never be (a) more than one group in a segment, or (b) a group blocked from hitting (unless on a segment that contains a green) because the segment ahead is occupied.

Each hole segment is assigned a proportionate share of the time par for the hole. In the example immediately above the 430 yard par 4 may have a 13.8 minute time par. Segment 1 may be assigned 3.0 minutes, segment 2 assigned 6.5 minutes and segment 3 assigned the remaining 4.3 minutes.

Preferably, the system continuously checks each group's progress from the start (defined as the time a group enters the second segment of the first hole played, typically hole #1), then the time in the current segment, and then time over the most recent segments. "Most recent segments" are defined as the sum of time spent in the current segment in which the group is located, plus the time spent in any previous segments of the same hole, plus 1) the time spent in all of the segments of, for example, 1 to 3 previous holes or 2) since last blocked. The system progressively monitors and analyzes each group's pace, not just from the first tee, but over enough recent play, since the group was last blocked, to make a determination if the group is on—or not on—time par.

FIG. 5 is a logic flow diagram showing in general how the traffic control algorithm operates in order to make a determination if and when a group is at fault for being slow, and should be signaled to speed up via remotely activating a signal light on the hole they are playing. System logic may be described as follows and with reference to FIG. 5:

Tracking—Continuous location (GPS) tracking and time stamping all group positions (i.e., every 10-15 seconds) and comparing with the mapped/fenced segmented time pars.

Blocked Groups Are Not At-Fault—Determine if a group is blocked by the group preceding them (502):
  Both occupy the same segment.
  Occupy adjacent segments (unless the next segment is a tee box and the segment behind is a green complex).
  If not, then group is not blocked.
  If blocked, then pace vs. time par is not relevant in determining At-Fault for being Behind Pace.

Identify Groups Behind Time Par—For each group not blocked, determine if the group is behind pace and at-fault (AtFaultBehindPace):
  Behind time par for all holes played (503)* AND EITHER (a) behind time par for the current segment (504)* OR (b) behind time par for a recent series of segments (for example, current hole segments+segments of one to three immediately prior full holes; 505)*
  *Time par comparisons are adjusted for any previous blocked time or any other predetermined tolerances or allowable adjustments like play-through transition time or set-up time while blocked.

Signal Corrective Action—Activate flagstick light (506) on the next forward signal light, such as the signal light for the green currently being played, when cleared and next approached by the AtFaultBehindPace group. Notify course management of the hole location and group that is signaled. A key objective is to quickly identify, focus on and communicate with the At-Fault group, and only the At-Fault group in order to expedite their pace and hopefully regain an on pace position on the course This "progressive" analysis guards against signaling a group that they are slow in a single segment, if in fact they are on total time par from the start, but incur a pace delaying incident (lost ball, OB, club left behind . . . ) on their current hole. Likewise, if they are over total time par from the start for whatever previous reason(s), but are now on pace for the current segment and last several holes, they are not signaled to speed up. By ensuring the analysis includes progress on the most recent holes to determine at-fault groups, the invention avoids the problem of many other pace of play systems which typically base calculations of pace from a "fixed," booked tee time that may or may not have been actual. Tee times that may have been, for example, over 3 hours and/or 12 holes ago, and therefore are not always relevant for determining the current pace of play status to a group that is on the $13^{th}$ hole. Extended periods of multiple groups playing sequentially may render useless the relevance of a starting time based calculation to judge pace because of all the variability, flow dynamics and group interactions that may have occurred since that starting time.

When the system determines that a group's pace on recent segments has been slower than time par, it checks to see if the group is currently or has recently been impeded by the group ahead. The purpose of this logic is to find and focus on the group most responsible for causing any slowdown (the At-Fault group), and not on a group simply affected by such a slowdown.

The invention (other than for the first several holes while it notes the elapsed time since exiting the first tee), should focus on recent pace of play. That is, the system's focus is on time par comparisons for the most recently played holes. Light signaling occurs if and when a group, focusing on that group rather than others, is playing too slowly.

When a golfer group is determined to be At-Fault for slow pace, the system triggers a visual signal directed just to them, and them alone. The light signal is silent, minimally invasive, but clear and highly visible, and therefore, public in its communication. In a preferred embodiment, multiple small, diffused high intensity LED lights 202 attached to the top of the flagstick (see FIG. 2C) are activated, with the flagstick on the green complex that is being played, or on the next unoccupied green complex being approached by that At-Fault group. It is preferred that the light is capable of unaided visual detection from not less than 180 meters.

The invention includes an embodiment that also presents a blinking signal light. This blinking light may be used to signal a warning to a group that, while they have not yet been determined to be behind pace, they are trending toward such a determination and should respond accordingly by increasing pace before they get the full light-on warning.

Additionally, other embodiments may have several speeds of blinking, or even lights of different colors to indicate different degrees of being behind pace. A red light, for instance, may indicate that a group is so far behind on pace that course management requires they skip ahead on the course until they catch up and are back into the proper position behind the group in front of them.

There may be locations on the course ("blindspots") where the light signal from the flagstick is not visible to a group that has been determined to be At-Fault. A group may find themselves in this situation, for example, approximately one fourth of the total round time. The situation may occur when the group is on a par 4 tee box or a par 5 tee box or the first fairway segment of a par 5, or if the group is in the fairway and another group is on the green, as the light does not go on for the fairway group until the green is cleared when the signal light is positioned on or near the green. These "blindspots" on the course may, if they are found to appreciably delay pace remediation, be addressed in several ways. First, by using the aforementioned blinking light warning system, and second, if necessary, by positioning one or more additional signal lights, which may be located by the tee box complex or along a fairway segment, on the positioning device, or on a golf carts. If the signal light is on the positioning device, the positioning device may have a vibration feature or an audible feature in case the positioning device is out of sight. Course architecture and actual course timing data are factors in determining if this additional signaling is necessary.

At the same time that the invention activates a signal light, it actively and specifically alerts course management (starter, marshal, pro shop . . . ) that Jones/8:42, currently 175 yards out from the 14$^{th}$ green, is falling behind pace. While, importantly, the invention does not depend on course management to either make the At-Fault decision or deliver the message and police the situation, it concurrently offers the option of that scenario so that a marshal may follow up as necessary. The invention is preferred to be "marshal-less." It is meant to be effective with minimal, or no, course personnel involvement.

For example, Jones' group has been warned and prompted by the signal light to increase the pace of play to the target pace, and hopefully close the gap with the group ahead as they proceed through subsequent holes. Course management may decide how they wish to enforce signal warnings. Depending on the circumstances, like the density of play, or the severity of the hold up, or the number of warnings involved with the same group, management may tailor their response. For example, on a light play day they may take no action. Or, when play is heavy, they may choose to become more actively involved and direct an At-Fault group to skip a hole, be penalized a stroke, have their name posted in the clubhouse or website, letter sent, golfing privileges suspended, not allowed to book future weekend morning tee times or similar action taken. Note that, preferably, management can likewise consider positive incentives for consistently playing on pace and not receiving any warnings, such as pro shop discounts, free drinks, availability of premium tee times, etc.

Course management retains the prerogative to adjust, inactivate, or override the system at any time, as well as remotely manipulate any signal light.

The algorithm controlled light acts as an impartial and objective "authority." Golfers can argue with a marshal that they are not playing slowly when it is only a marshal's judgment call. Most golfers do not believe that they are slow, but readily believe that most others are. It is more problematic to argue with a GPS tracking system that logs a group's actual hole-by-hole playing times, especially one that also tracks the group ahead and knows which group is the problem. It is easier for the marshal to win the point if the marshal has to become involved. "It is not just my opinion that you are playing too slow . . . you clocked 6 minutes behind pace for the last hole, and 3 minutes behind already on this one." In addition, the system may allow the marshal to override the system, including control of the light, as circumstances may indicate.

The light signaling component quickly, directly and clearly communicates with the At-Fault golfer group, reducing communications latency as compared to a marshal seeking out and verbally communicating with the At Fault group. Depending on how many marshals are out on the course, after being alerted, it may take 5 to 10 minutes or more of response time to drive out to the hole where the At-Fault group is positioned, inform them of their lagging play and encourage them along. There may be too few marshals on duty to effectively monitor an entire 18 hole 4 mile golf course, particularly if there are poor sight lines between holes. Every minute between the time a group slows unacceptably and when the marshal confronts them results in time being added to the round for them as well as for any impeded trailing groups. This is particularly true during times the golf course is loaded to maximize throughput and revenue.

The algorithmic logic in the system is capable of determining circumstances that deviate from the normal order and flow of play. The system recognizes and takes into account predefined exception situations and irregular events that may occur on a golf course and may interrupt the standard flow of play. FIG. 5; 501. Such situations are outside of the differences in individual playing skills and speeds that contribute to the variability between group times, and include such occurrences as: faster groups playing through slower groups; varying group sizes; the GPS tracker being carried by the golfer who hit their ball into the wrong fairway; the GPS carrying golfer doubling back to take a second tee shot because of an out-of-bounds situation, or to retrieve a lost club; groups quitting mid-course; shotgun starts; "starter tee times" or no shows; weather delays; mix of 9 and 18 hole players; hole skipping, etc. By way of "sanity checks" and extrapolation, the invention is designed to recognize these sorts of situations and irregular events and account for them in an appropriate manner.

A major factor in course congestion and round time deterioration is variability. Small things happening randomly around the course which when taken individually may only slow play a little, but which in the aggregate, and coupled with any compounding effect, contribute to making round times too long for everyone. The invention's "progressive" logic (not dependent simply on elapsed clock time from the first tee, or even just for the current hole) and ability to recognize and deal with predefined but irregular events helps to lessen the probability of erroneously signaling a group playing off pace that is not the cause of off pace play. When a group allows a faster group to play through, that transition time is accounted for by the invention's algo logic, and the group allowing the play-through is accorded an appropriate allowance, or tolerance for their courtesy.

There are several interrelated aspects to pace of play that are addressed by the invention. There is the elapsed time to play a round, and there is the time spent waiting to hit during that round. A golfer may be unhappy with a 4:15 round if they have to wait too often or too long to hit the ball. On the other hand, that same golfer may be happy with a 4:45 round if they do not have to wait too often, or for too long, to hit. And finally, there is the issue of round time expectations and predictability. If a player knows and can count on their round taking 4:30, it may be far more desirable than not knowing and having it take anywhere between 4:00 and 5:00, or worse. The invention takes into account and is designed to improve upon these interrelated pace of play factors.

A method of regulating golf play according to the invention may comprise dividing a golf course into a plurality of segments; assigning an assigned time for completion of each segment; positioning spaced apart signal lights on the golf course; and providing a user of the golf course with a wireless positioning device. A computing device may receive signals from the wireless positioning device indicating progressive segments in which the user is located and compare an elapsed time for completion of a number of segments by the user with the total assigned time for the number of segments completed. A "user" may be an individual playing alone, but more commonly is a group of golfers playing together and even more commonly, a foursome.

In an embodiment of the method of the invention, a step is taken to determine if a user is blocked by another user of the golf course 502. A user is blocked if either of two situations exists: 1) when two users are located within the same segment; or 2) when two users occupy adjacent segments, unless they are adjacent segments that include the green and the next tee box. If either case exists, a determination is made that the trailing user is not at-fault for slow play and no visual signal is activated for the trailing, blocked user. The user in front (as well as every user on the course in intervals such as 10-15 seconds) may be tracked, timed and signaled (or not signaled) as appropriate.

According to one method, the determination is made if the user is blocked by another user. If the user has not taken longer than the allotted time for all prior segments, then no action is taken 503. If the user is not blocked, but has taken longer to play the course than the sum of the time pars allotted for segments prior to and including the current segment, then additional analysis is undertaken, such as those determinations outlined below.

As a further embodiment, if the user is not blocked by another user but has been positioned in the current segment for longer than the time par allotted, an appropriate tolerance time may be added to the time par so as to not activate a visual signal for a relatively small single segment time overrun. If the user is blocked at any time while in the current segment, the calculation is based on the point at which the user becomes unblocked, and the time allowed for the segment is adjusted to account for the time that they could have productively used, for example, setting up for a shot even though blocked. If the time par plus tolerance time is exceeded for the current segment, the next most proximate visual signal to that user of the spaced apart visual signals is activated 504.

As yet another embodiment, if a user is not blocked by another user, a determination is made if the user has exceeded the sum of time pars allotted for the most recent segments, rather than all segments of the golf course completed by the user 505. "Most recent segments" include the current segment in which the user is located, plus any other segments of the same hole that are completed, plus the sum of all the segments of recent holes (e.g. 2 prior holes), plus an appropriate tolerance time, or since the user was last blocked. If the aggregate time pars plus a tolerance (if applicable) is exceeded for the most recent segments, the visual signal of the spaced apart visual signals most proximate to that user is activated. If the aggregate time pars plus a tolerance (if applicable) is not exceeded for the most recent segments, the visual signal of the spaced apart visual signals most proximate to that user is not activated.

Any of the time par settings and tolerance times may be adjusted to course conditions and circumstances. An additive time par may be adjusted for recent segments for current conditions that are applicable to an individual user or to multiple users.

When a user has been recently blocked and becomes unblocked, the time par for the segment in which the user is located may be adjusted to account for "set-up time." This means that an amount of time is subtracted from the current segment time par, depending on whether it is a tee or fairway segment. This "set-up time" is to account for the time already spent by the user setting up for the next shot before or while waiting on (being blocked by) the user ahead.

The definition of "most recent segments" may be adjusted for circumstances. The applicable most recent segments may be configured in the system according to the golf course and according to overall course demand and conditions.

A user is never at fault for slow play if the user is blocked by another user, and the user is not signaled in those cases. A user who is not blocked and playing behind pace in the current segment or the most recent segments is determined to be at fault and is signaled.

What is claimed:

1. A method of regulating a pace of golf play, comprising the steps of:
   dividing a golf course into a plurality of segments, wherein holes of the golf course comprise more than one segment of the plurality of segments, and wherein each segment of the plurality of segments comprises a geo-fenced boundary;
   assigning a permitted time for completion of each segment of the plurality of segments by a user of the golf course;
   positioning a plurality of spaced apart signal lights on the golf course;
   a computing device comparing an elapsed time of completion of a number of segments of the plurality of segments by the user with a sum of permitted times for completion of the number of segments of the plurality of segments completed by the user; and
   the computing device wirelessly actuating a signal light of the spaced apart signal lights on the golf course when the elapsed time of completion by the user of the number of segments of the plurality of segments is greater than the sum of permitted times for completion of the number of segments of the plurality of segments completed by the user.

2. The method of regulating a pace of golf play of claim 1, further comprising the steps of:
   the computing device determining if progress on the golf course by the user of the golf course is blocked by another user on the golf course;

the computing device determining a segment of the plurality of segments in which the user of the golf course is located if the user's progress is blocked by another user on the golf course.

3. The method of regulating a pace of golf play of claim 1, further comprising the steps of:
the computing device determining if progress on the golf course by the user of the golf course is blocked by another user on the golf course;
the computing device determining a segment of the plurality of segments in which the user of the golf course is located if the user's progress is not blocked by another user on the golf course;
the computing device determining whether an elapsed time for completion of the segment by the user of the golf course when the user's progress is not blocked by another user on the golf course exceeds a time assigned by the computing device for completion of the segment; and actuating a signal light if the elapsed time for completion of the segment by the user of the golf when the user's progress is not blocked by another user on the golf course exceeds the time assigned by the computing device for completion of the segment.

4. The method of regulating a pace of golf play of claim 3, wherein determining the time assigned for the segment in which the user is located comprises the step of the computing device subtracting a set-up time tolerance from an initial assigned time for the segment.

5. The method of regulating a pace of golf play of claim 1, further comprising the steps of:
the computing device determining if progress on the golf course by the user of the golf course is blocked by another user on the golf course;
the computing device determining whether an elapsed time for completion of multiple consecutive segments of the golf course when the user's progress is not blocked by another user on the golf course exceeds a time assigned by the computing device for completion of the multiple consecutive segments; and
actuating a signal light of the spaced apart signal lights on the golf course if the elapsed time for completion of the multiple consecutive segments by the user of the golf when the user's progress is not blocked by another user on the golf course exceeds the time assigned by the computing device for completion of the of multiple consecutive segments.

6. The method of regulating a pace of golf play of claim 1, wherein, if the assigned time for completion of the multiple segments is exceeded, the computing device wirelessly actuates a signal light of the spaced apart signal lights to indicate to the user of the golf course approaching a green when the green is clear of another user on the golf course.

7. The method of regulating a pace of golf play of claim 1, further comprising the step of the computing device adding tolerance time to an assigned time for a number of segments, wherein a current segment in which the user is located is included in the number of segments to which tolerance time is added.

8. The method of regulating a pace of golf play of claim 1, wherein the plurality of spaced apart signal lights are attached to flagsticks located on greens of the golf course.

9. The method of regulating a pace of golf play of claim 1, wherein a signal light of the plurality of spaced apart signal lights is present within each green complex of the golf course, and the signal light is visible to golfers on a fairway of the golf course that is associated with the green complex from a distance of not less than 180 meters.

10. The method of regulating a pace of golf play of claim 1, wherein each of the plurality of spaced apart signal lights is attached to a flagstick and above a flag of the flagstick, and wherein the flagstick comprises reflective surfaces for laser rangefinder compatibility.

11. The method of regulating a pace of golf play of claim 1, wherein each of the plurality of spaced apart signal lights communicates with the computing device via a low power wide area network.

12. The method of regulating a pace of golf play of claim 1, wherein each signal light of the plurality of spaced apart signal lights comprises a GPS transponder that communicates with the computing device.

13. The method of regulating a pace of golf play of claim 1, wherein a unique identifier is assigned to each user of the golf course, and a location of the user within a segment of the plurality of segments appears on a map of the golf course, and when a signal light is activated for the user, the user is separately coded on the map of the golf course.

14. A method of regulating a pace of golf play of claim 1, wherein the computing device communicates a position and progress of each user to golf course management in the form of application screen displays and alerts.

15. A method of regulating a pace of golf play of claim 1, further comprising the steps of golf course management setting permitted times for completion of segments and subsequently modifying the permitted times for completion of segments based upon changing circumstances or course conditions.

16. The method of regulating a pace of golf play of claim 1, wherein the total number of segments is not less than the course par stroke rating minus a total number of holes of the golf course.

17. The method of regulating a pace of golf play of claim 1, further comprising a segment of the plurality of segments positioned between a first nine holes of the golf course and a second nine holes of the golf course.

18. The method of regulating a pace of golf play of claim 1, wherein tolerance time is added to a segment of the plurality of segments for varying golf course conditions.

19. The method of regulating a pace of golf play of claim 1, further comprising the steps of:
the computing device determining if progress on the golf course by the user of the golf course is blocked by another user on the golf course;
the computing device determining a segment of the plurality of segments in which the user of the golf course is located when the user's progress is blocked by another user on the golf course;
wherein the segment of the plurality of segments in which the user of the golf course is located when the user's progress is blocked by another user on the golf course is the segment of the golf course in which another user of the golf course who is a blocking user is located or is the segment of the golf course adjacent to a segment of the plurality of segments in which the blocking user of the golf course is located.

20. The method of regulating a pace of golf play of claim 1, wherein a hole of the golf course comprises four (4) segments.

* * * * *